Feb. 6, 1934.　　　　　J. CAMPBELL　　　　　1,946,013

PLURAL DECK VEHICLE BODY

Filed Feb. 18, 1933　　　2 Sheets-Sheet 1

Inventor
James Campbell

By Williams, Bradbury, McCaleb & Hinkle, Attys.

Feb. 6, 1934.  J. CAMPBELL  1,946,013
PLURAL DECK VEHICLE BODY
Filed Feb. 18, 1933  2 Sheets-Sheet 2
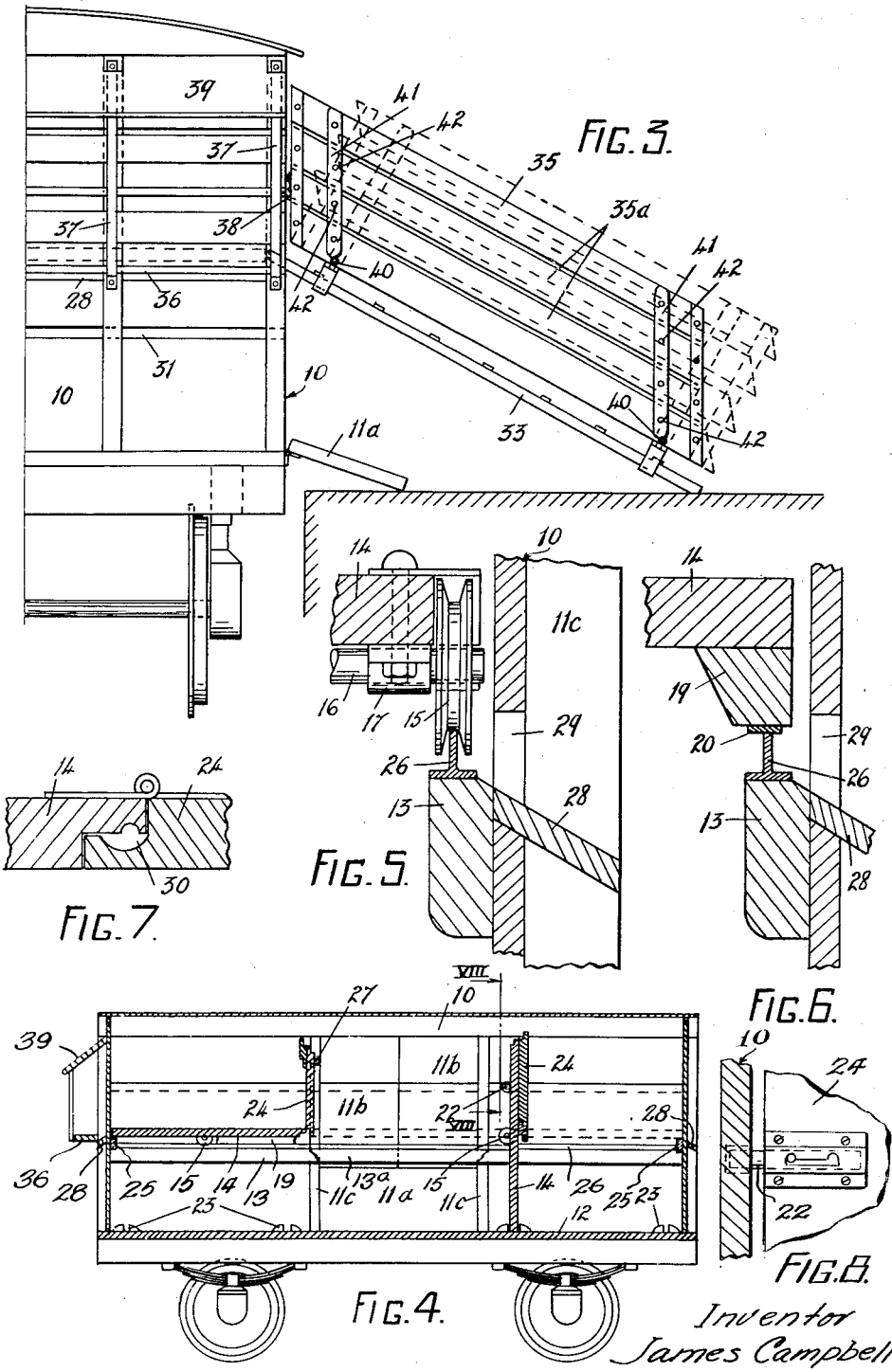
Inventor
James Campbell
By Williams, Bradbury, McCaleb & Hinkle
attys.

Patented Feb. 6, 1934

1,946,013

UNITED STATES PATENT OFFICE 1,946,013

PLURAL DECK VEHICLE BODY

James Campbell, Doune, Scotland, assignor to Archibald Fraser, Glasgow, Scotland Application February 18, 1933, Serial No. 657,393, and in Great Britain January 15, 1932

15 Claims. (Cl. 119—9)

This invention relates to rail or road vehicles or wagons, and the object of the present invention is to enable a rail or road vehicle or wagon body or truck to be readily converted from a single deck vehicle into a double deck vehicle. It is a further object of the invention to enable the interior space of the vehicle body to be readily sub-divided into two or more compartments separated by vertical partitions or to be sub-divided into two compartments separated from one another by a vertical partition, one of said compartments being further sub-divided by a horizontal partition or by both horizontal and vertical partitions.

The invention is applicable for example to existing single deck railway wagons for the transport of live stock such as cattle or sheep, and the object of the invention is to enable the wagon to be used for carrying mixed loads, e. g. cattle, sheep and pigs, all at one time.

The invention is also designed to enable the several compartments of the wagon to be rapidly loaded and by enabling the total capacity of the wagon to be utilized, less wagons are required for transporting a given total load, thus reducing shunting and haulage costs.

In order that the invention may be more clearly understood, reference is hereinafter made to the accompanying drawings illustrating the invention as applied to a railway cattle wagon.

Fig. 3 is half an end view of the wagon shown in Fig. 1 showing the loading ramp in position.

Fig. 4 is an outline sectional elevation illustrating an alternative arrangement of the partitions.

Fig. 5 is a detail vertical sectional view of the partition taken on the line V—V in Figure 1, showing the roller and rail and Fig. 6 is a detail vertical sectional view of the partition taken on the line VI—VI in Figure 1 showing how it rests on the rail.

Fig. 7 is a detail sectional view through one hinge of the deck sections taken on the line VII—VII of Fig. 2.

Fig. 8 is a detail sectional view of the fastening means taken on line VIII—VIII of Fig. 4.

Figure 1:
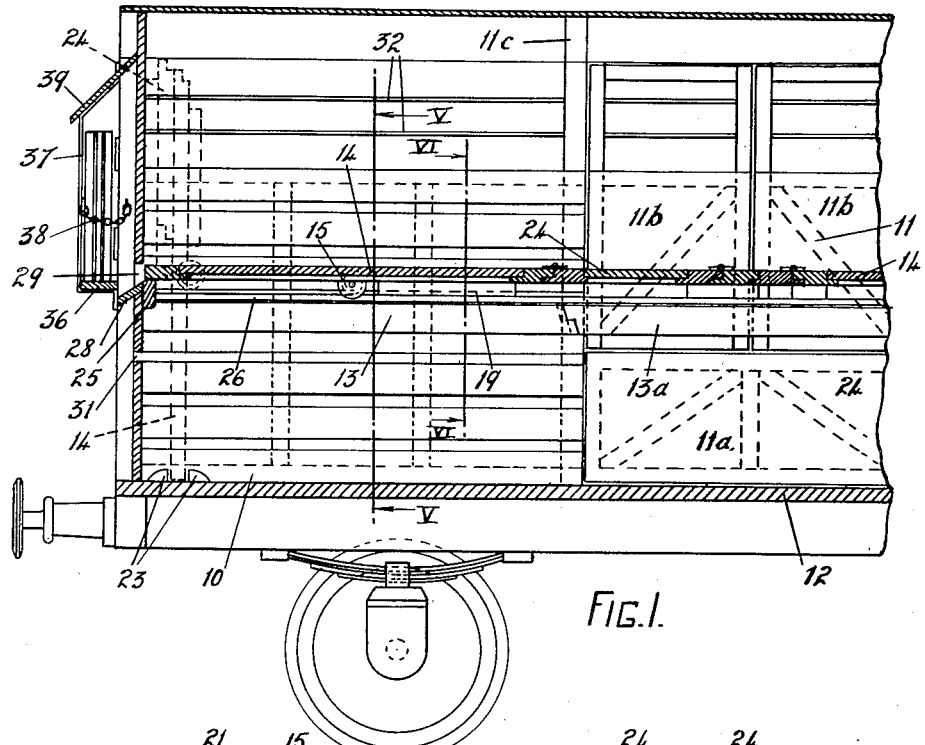
Fig. 1 is a sectional elevation of the greater part of a wagon and Fig. 2 is a plan view of the horizontal partition or upper deck and part of a ramp.

As shown the wagon body 10, which is of the usual cattle truck construction having side doors 11 which may comprise a lower section 11a hinged to the floor 12 and two upper half doors 11b hinged to vertical posts 11c, is provided along each side of the wagon and on the inside thereof with a pair of longitudinal rails 13 fixed at a convenient height above the ordinary floor 12 of the wagon to support an upper deck at such a height that sheep or other loads can be accommodated below the upper deck.

The rails 13 support an upper deck consisting of two partitions or deck sections 14 mounted on rollers 15 adapted to traverse the rails 13 in order that the partitions 14 can be laid horizontally together end to end to form a complete upper deck as shown in Fig. 1 or to be moved into vertical positions as shown in the case of the right-hand partition in Fig. 4 to divide the wagon into two or more compartments. Each partition 14 is provided with a pair of rollers 15 keyed or otherwise mounted on the ends of a cross-shaft 16 fixed or revolubly attached by bearings or brackets 17 (Fig. 5) to the partition 14. The cross-shaft 16 is preferably so arranged that the upper part of the partition, when the latter is turned from the horizontal position, slightly over-balances the lower part, so that the partition can be readily turned on its rollers 15 into or out of a horizontal position. In order that the upper part of the partition 14 may rest on the rails when in a horizontal position, strips 19 (Fig. 6) are attached to the underside of the partition 14 and each strip 19 may be shod with a metal strip 20 to prevent the rails wearing into the strips 19. To permit the lower portion of the partitions 14 to clear the rails 13 when it is desired to turn the partitions into a vertical position, the lower portion of each partition 14 is made just sufficiently narrow to pass between the rails 13 and the spaces thus left along part of the side edges of the partitions, when the partitions are horizontal, are filled in with fillets 21 hinged to the edges of the partitions.

End rails 25 are preferably provided across the ends of the wagon 10 inside the same to support the end transverse edge of partition 14 when turned horizontally to form an upper deck. When the partition 14 is tilted from its vertical to its horizontal position it is moved sufficiently along the rails 13 on the rollers 15 toward the center of the car for the bottom edge of the partition to clear the end rail 25 and when the partition reaches its horizontal position it is moved toward the end of the car to support its end transverse edge on the end rail 25.

The partitions 14 are provided with fasteners 22 of any convenient type in order that the partitions can be locked in vertical positions either at the ends of the wagon 10 as shown by dotted lines in Fig. 1 or in any desired position between the two ends as shown in the case of the right-hand partition in Fig. 4, the fastenings 22 engaging fastening means provided in the side frames of the wagon. The floor of the wagon is also provided with chocks 23 against or between which the lower edges of the partitions fit when in the desired vertical positions, the chocks 23 serving to steady the partitions in position.

Figure 2:
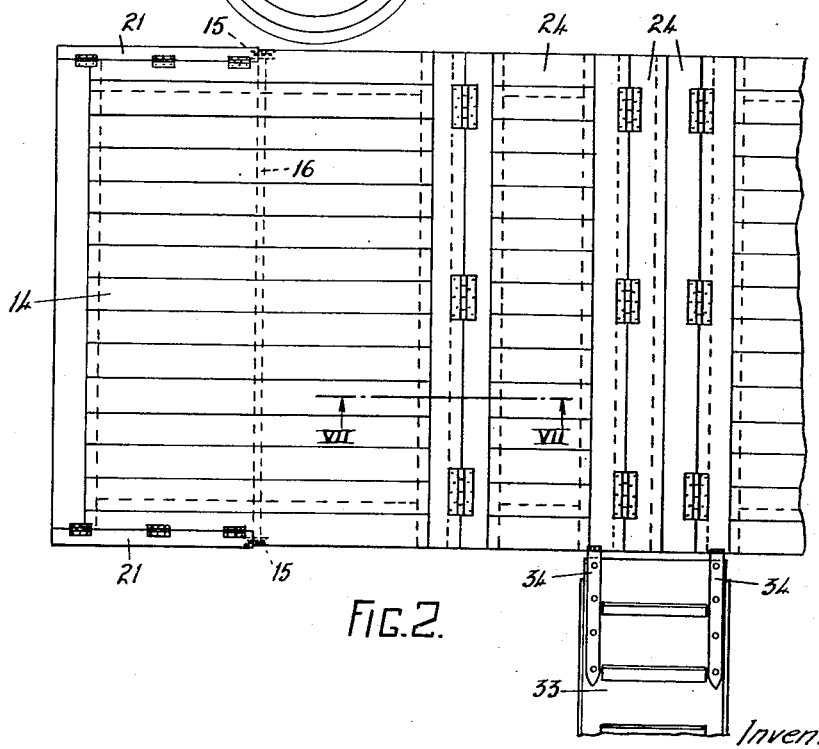

Preferably the rollers 15 are so positioned that they are just clear of the longitudinal rails 13 when the partitions 14 are vertically disposed and rest on their lower edges, so that the partitions must be slightly tilted before the rollers 15 rest on the rails 13. This enables them to move clear of the floor chocks 23 when rocked on their rollers 15 out of the vertical position. This arrangement of the rollers 15 in conjunction with the heavier upper end of the partion also reduces the risk of the partition overturning beyond the vertical position when it is being turned into an upright position and while it is turning about its lower edge as a fulcrum.

Where the height of the wagon 10 is less than half the length of the wagon, as is the case in the wagon illustrated in the drawings, the partitions 14 are each provided at their upper ends with hinged flaps 24 which, when turned into line with the remaining parts of the same when the latter are turned into a horizontal position, will form with the partitions 14 a complete upper deck, the flaps meeting in the middle. when the upper hinged part 24 of the partition, shown in a vertical position in Figure 4, is swung to a horizontal position, as shown in Figures 1 and 2, this upper part requires no supporting strips 19 such as are provided on the underside of the partition 14, since the hinged joint with the lower part of the partition supports this section as a cantilever. Two or more flaps 24 hinged successively to each other may be employed to suit the length of the wagon.

The longitudinal rails 13 are preferably of timber carrying on top light section flat bottom metal rails 26 on which the rollers 15 run (see Fig. 5). The longitudinal rails 13 are made with removable sections 13a at the side doors 11, the removable sections 13a being checked at their ends to engage corresponding checks in the fixed portions 13 of the rails.

When a single compartment only is required, the two partitions 14 may be fixed in a vertical position one at each end or both at one end of the wagon.

To divide the vehicle body space into three compartments, the two partitions 14 may be vertically disposed and spaced from one another and from the ends of the wagon, or one partition 14 may be vertically positioned to divide the space into two compartments, and one of said compartments may be horizontally divided by turning the other partition 14 into a horizontal position. The length or height of the partition may be such that, when horizontal, it will extend from one end of the wagon to the door posts 11c at one side of the doorways and the flap 24 may be turned up into a vertical position as shown in the left half of Fig. 4 and secured to the door posts 11c by a bolt or other fastening 27 (which may be similar to fastening 22 shown in Fig. 8) to retain loads on the upper deck thus formed by the partition.

The partitions 14 and flaps 24 are made watertight and any water which may gather on the upper deck is allowed to drain over the sides and ends of the partitions and flaps on to a sloping drain board 28 (Figs. 1, 5 and 6) secured to the sides and ends of the wagon and passing outwards through an opening 29 to lead the water from the partitions 14 and flaps 24 to the outside of the wagon, thus preventing any water dripping down into the lower space of the wagon. Also to prevent any water passing through between the hinged sections of the upper deck, the edges of the sections are formed with drained joints as shown for example in Fig. 7, in which the lower projecting edge is provided with a groove or channel 30 which gathers the water and leads it away to either side of the wagon where it flows off over the drain board 28. Instead of forming the channel 30 in the partitions or flaps, it could be formed in a strip secured to one of the hinged members directly beneath the joint to collect and discharge the water passing through the joint.

Additional ventilation may be provided for the lower deck by making openings 31 in the sides and ends of the wagon or by making the lower part of the wagon sides sparred as shown in Fig. 1. The open upper part of the wagon, which is usually protected by horizontal iron bars 32, may for the purpose of carrying sheep or the like on the upper deck be further protected with a board all round and/or additional bars. The upper side of the upper deck may be fitted with tread-bars to prevent the sheep or the like from slipping.

In order to facilitate loading of the upper deck while simultaneously allowing loading of the lower deck or floor of the wagon 10, a ramp or gangway 33 of smaller width than the doorway 11 is provided. The ramp or gangway 33 is provided with hooked members 34 (Fig. 2) or other means for detachably attaching it to the upper deck or to the rail section 13a and the ramp or gangway is provided with hinged sides 35 adapted to fold one above the other on to the floor 33, so that the ramp can be stored on a shelf 36 provided at one end of the wagon 10 outside the same. The ramp is slid endwise upon the shelf 36 and is fixed in folded position against the end of the wagon 10 by means of fixed or adjustable straps 37 and chains 38. An inclined weather-board or rain deflector 39 is secured to the end of the wagon above the shelf to protect the ramp stored thereon.

The sides 35 of the ramp or gangway 33 are preferably attached to the floor portion 33 by means of universal hinges 40 and, in order that the floor and sides of the ramp may be the same length as the full width of the wagon and yet allow the sides of the ramp to fit close up to the wagon while enabling the folded ramp to fit against the end of the wagon without projecting beyond the wagon sides, the battens 35a forming the sides 35 are attached to the straps 41 of the hinges 40 by means of pivot pins 42, in order that the sides can be moved out of a rectangular form into the form of a parallelogram and viceversa. By pulling and/or pushing on the sides of the ramp, it can be made to take up the positions shown in full and broken lines in Fig. 3, the full lines showing the position when being used for loading the wagon and the broken lines showing the position when about to be folded for storing at the end of the wagon. The sides of the ramp may be maintained apart for use by one or more detachable cross-bars, and one or both sides may be detachably secured to one of the door posts by a chain or other suitable form of fastener.

The lower flap 11a of the door 11 can be used in the usual way for loading the lower deck or floor of the wagon.

The partitions being slightly overbalanced can be readily handled and moved from one position to another.

The partitions are preferably of such a height when folded that they can be inserted in and removed from the wagon by passing them diagonally through one of the doorways.

My invention enables existing single-deck railway wagons for cattle transport to be readily and cheaply converted for use as double-deck wagons.

I claim:

1. A vehicle body having a doorway in one of its upright walls, a partition, means for pivotally supporting said partition substantially midway between its ends upon a horizontal axis situated at a distance above the floor of the vehicle, thereby to enable the partition to be swung from a horizontal to an upright position, and for sustaining the partition in a horizontal position to form an upper deck, and means for sustaining said partition in any one of a plurality of vertical positions, said pivotal supporting means permitting movement of the partition towards and against one upright wall of the vehicle body when the partition is turned out of a horizontal position.

2. A vehicle body having a doorway in one of its upright walls, a partition, and means for maintaining the partition in its horizontal position, said means including a pair of bearers carried by two opposite upright outer walls of the vehicle body, and aligned trunnions at two of the opposite side edges of the partition, said trunnions being disposed substantially midway between the ends of said partition and being supportable upon said bearers, said partition being rotatable about the trunnions to rest upon said bearers and form a supporting floor.

3. A vehicle body as specified in claim 2, wherein the trunnions comprise coaxial rollers rotatably journalled on the opposite side edges of the partition and the bearers extend horizontally along the full length of the two opposite upright walls of the vehicle body, thereby to enable the rollers to travel along the full length of the bearers when the partition is turned out of a horizontal position.

4. A vehicle body having a doorway in one of its upright walls, a partition adapted to form a supporting floor and means for pivotally supporting said partition substantially midway between its ends and within the vehicle body upon a horizontal axis situated at a distance above the floor of the vehicle, thereby to enable the partition to be swung from a horizontal to an upright position, said means including a pair of bearers carried by two opposite upright outer walls of the vehicle body and positioned to support in its horizontal position that part of the partition which is uppermost in the vertical position.

5. A vehicle body having a doorway in one of its upright walls, a partition, aligned trunnions at opposite side edges of said partition and intermediate its ends, said trunnions being so positioned that the partition is slightly unbalanced, bearers carried by outer walls of the vehicle body for supporting said trunnions at a distance above the vehicle floor, the heavier end of the partition forming the upper part of the partition when the latter is turned out of a horizontal position, and means within the vehicle body for supporting said partition in its horizontal position.

6. A vehicle body having a doorway in one of its upright walls, a pair of longitudinal rails carried by opposite upright walls of the vehicle body at a convenient height above the floor of the vehicle body to support an upper deck, a plurality of sections which, when assembled together end to end horizontally, form a complete upper deck, aligned trunnions provided at opposite side edges of each of said sections intermediate their ends, said trunnions being adapted to rest upon and travel along said rails, means for sustaining said sections in horizontal aligned position, and means for individually sustaining said sections in upright positions.

7. A vehicle body as specified in claim 6, wherein said means for individually sustaining said sections in upright positions include spaced abutments on the vehicle floor for embracing the lower edges of the sections to enable the sections to be rocked when they are in an upright position.

8. A vehicle body having a doorway in one of its upright walls, a pair of horizontal bearers carried by opposite upright walls of the vehicle body at a distance from the floor of said vehicle body, a partition, aligned trunnions extending from opposite side edges of said partition intermediate its ends, said trunnions being adapted to rest upon and travel along said bearers and said partition having a portion of reduced width to pass between said bearers and a portion of greater width to rest on said bearers, and strips fitted to the side edges of the portion of said partition of reduced width for filling the spaces between the edges of the portion of the partition of reduced width and the adjacent vertical walls of the vehicle body when the partition is in a horizontal position.

9. A vehicle body having a doorway in one of its upright walls, a pair of horizontal bearers carried by opposite upright walls of the vehicle body at a distance from the floor of said vehicle body, one of said bearers being carried by the doorway wall and having a removable section across the doorway, a partition, and aligned trunnions at opposite side edges of said partition and intermediate its ends, said trunnions being adapted to rest upon and travel along said bearers.

10. A vehicle body having a doorway in one of is upright walls, a partition, and means for pivotally supporting said partition within the vehicle body upon a horizontal axis situated a distance above the floor of the vehicle, thereby to enable the partition to be swung from a horizontal to an upright position, and for sustaining the partition in a horizontal position, said means for pivotally supporting the partition comprising a cross-shaft, means attaching said cross-shaft to the partition substantially midway between the ends of the partition, a pair of rollers mounted on the opposite ends of said cross-shaft, and horizontal bearers on the vehicle body for supporting said rollers.

11. A vehicle body having a doorway in one of its upright walls, a plurality of partitions including at least one partition made in sections to fold upon one another and to unfold into line with each other, means for pivotally supporting each partition upon a horizontal axis situated at a distance above the floor of the vehicle, thereby to enable each partition to be swung from a horizontal to an upright position, and for sustaining the partitions in aligned horizontal position and means for locking at least one of the sections in a vertical position while the remaining section or sections are sustained in a horizontal position.

12. A vehicle body having a doorway in one of its upright walls, a plurality of partitions which, when assembled horizontally together, will form a complete upper deck, and means for pivotally supporting each partition within the vehicle body upon a horizontal axis situated at a distance above the floor of the vehicle body, thereby to enable each partition to be swung from a horizontal to an upright position, and for sustaining the partitions in aligned horizontal position, the plurality of partitions including at least one partition made in sections hinged together to fold upon one another and to unfold into line with each other and form a part of the upper deck when they are laid end to end.

13. An enclosed vehicle body having a doorway in one side wall thereof, a horizontal bearer attached to said side wall and having a removable section across said doorway, a horizontal bearer attached to the opposite side wall of the vehicle body, said bearers being located at a convenient height to support an upper deck, a plurality of sections which, when assembled together end to end horizontally form a complete upper deck, said sections overlapping at their joints, aligned trunnions provided at opposite side edges of each of said sections intermediate their ends, said trunnions being adapted to rest upon and travel along said bearers, means for sustaining said sections in horizontal aligned position, means for individually sustaining said sections in upright positions, and drainage channels along the joints of said sections.

14. A vehicle body as specified in claim 13 having drain apertures along the sides of the vehicle body just below the level of the upper deck, and external sloping drainage members positioned below said apertures.

15. An enclosed vehicle body of greater length than twice the height, and having a doorway in one side wall thereof, a horizontal bearer attached to said side wall and having a removable section across said doorway, a horizontal bearer attached to the opposite side wall of the vehicle body, said bearers being located at a convenient height to support an upper deck, a plurality of sections which when assembled together end to end horizontally form a complete upper deck, said sections overlapping at their joints, aligned trunnions provided at opposite side edges of each of said sections intermediate their ends, said trunnions being adapted to rest upon and travel along said bearers, each of said sections being composed of sub-sections hinged together to fold over one another and to unfold into line with one another, means for sustaining the sections and sub-sections in aligned horizontal position, means for individually sustaining said sections in upright position with their sub-sections folded together, and means for locking at least one sub-section in vertical position while the remaining section or sub-sections are sustained in horizontal position.

JAMES CAMPBELL.